(12) United States Patent
Yamamoto et al.

(10) Patent No.: US 7,191,303 B2
(45) Date of Patent: *Mar. 13, 2007

(54) STORAGE CONTROLLER

(75) Inventors: Akira Yamamoto, Sagamihara (JP);
Katsunori Nakamura, Odawara (JP);
Shigeru Kishiro, Odawara (JP)

(73) Assignee: Hitachi, Ltd., Tokyo (JP)

( * ) Notice: Subject to any disclaimer, the term of this patent is extended or adjusted under 35 U.S.C. 154(b) by 176 days.

This patent is subject to a terminal disclaimer.

(21) Appl. No.: 10/831,138

(22) Filed: Apr. 26, 2004

(65) Prior Publication Data

US 2004/0199737 A1    Oct. 7, 2004

Related U.S. Application Data

(63) Continuation of application No. 10/614,802, filed on Jul. 9, 2003, which is a continuation of application No. 10/139,248, filed on May 7, 2002, now Pat. No. 6,615,332, which is a continuation of application No. 09/149,666, filed on Sep. 9, 1998, now Pat. No. 6,408,370.

(30) Foreign Application Priority Data

Sep. 12, 1997  (JP)  .................... 9-248177

(51) Int. Cl.
G06F 12/16 (2006.01)
G06F 11/16 (2006.01)

(52) U.S. Cl. .................. 711/167; 711/114; 711/162; 714/6

(58) Field of Classification Search .............. None
See application file for complete search history.

(56) References Cited

U.S. PATENT DOCUMENTS

| 5,155,845 A | 10/1992 | Beal et al. ............... 714/6 |
| 5,257,352 A | 10/1993 | Yamamoto et al. ......... 711/136 |
| 5,504,861 A | 4/1996 | Crockett et al. .............. 714/13 |
| 5,544,347 A | 8/1996 | Yanai et al. ................. 711/162 |
| 5,577,222 A | 11/1996 | Micka et al. ................. 711/112 |
| 5,657,440 A | 8/1997 | Micka et al. ................. 714/16 |
| 5,680,640 A | 10/1997 | Ofek et al. .................. 710/19 |
| 5,692,155 A | 11/1997 | Iskiyan et al. .............. 711/162 |
| 5,734,818 A | 3/1998 | Kern et al. .................. 714/20 |
| 5,742,792 A | 4/1998 | Yanai et al. ................. 711/162 |
| 5,799,141 A | 8/1998 | Galipeau et al. ............. 114/13 |

(Continued)

FOREIGN PATENT DOCUMENTS

EP              671686         9/1995

(Continued)

*Primary Examiner*—Gary Portka
(74) *Attorney, Agent, or Firm*—Mattingly, Stanger, Malur & Brundidge, P.C.

(57) ABSTRACT

A primary controller operates to transmit write data and a write time to a secondary controller in the earlier sequence of the write times after reporting a completion of a request for write to a processing unit. The secondary controller stores the write data and the write time transmitted from the primary controller in the cache memory. At a time, the secondary controller stores the write data in a disk unit in the earlier sequence of the write time. These operations make it possible to guarantee all the write data on or before the reference time.

4 Claims, 6 Drawing Sheets

| U.S. PATENT DOCUMENTS | | | | | FOREIGN PATENT DOCUMENTS | | |
|---|---|---|---|---|---|---|---|
| 5,845,328 A | 12/1998 | Maya et al. | 711/162 | EP | 672985 | 9/1995 |
| 5,870,537 A | 2/1999 | Kern et al. | 714/6 | JP | 04291618 | 10/1992 |
| 5,949,970 A | 9/1999 | Sipple et al. | 714/15 | JP | 09006663 | 1/1997 |
| 6,044,444 A | 3/2000 | Ofek | 711/162 | JP | 09212425 | 8/1997 |
| 6,408,370 B2 | 6/2002 | Yamamoto et al. | 711/167 | JP | 9325917 | 12/1997 |
| 6,615,332 B2 | 9/2003 | Yamamoto et al. | 711/167 | WO | 9721177 | 6/1997 |

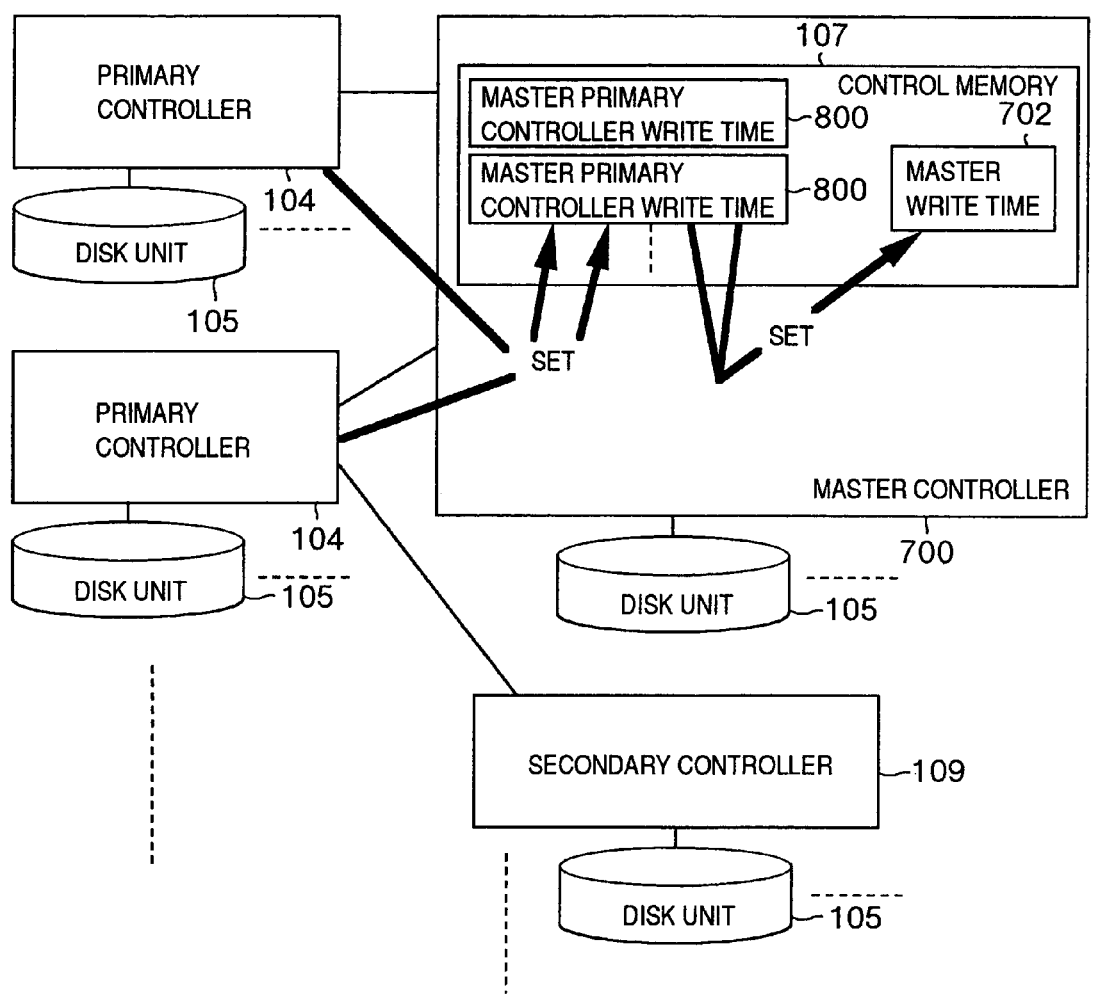

STORAGE CONTROLLER

The present application is a continuation of application Ser. No. 10/614,802, filed Jul. 9, 2003; which is a continuation of application Ser. No. 10/139,248, filed May 7, 2002, now U.S. Pat. No. 6,615,332; which is a continuation of application Ser. No. 09/149,666, filed Sep. 9, 1998, now U.S. Pat. No. 6,408,370, the contents of which are incorporated herein by reference.

BACKGROUND OF THE INVENTION

The present invention relates to dual writing of data to be executed through the effect of two controllers. In particular, the present invention is effective in the case that a long distance exists between the two controllers so that a delay takes place in transferring data between the controllers.

The following techniques have been disclosed as the prior art of the present invention.

The European Patent Publication No. 0671686A1 has disclosed a technique of doing dual writing through the effect of controllers spaced from each other by a long distance. In this technique, one controller guarantees data on a disk therein if the other controller is broken by a disaster such as an earthquake. The technique disclosed in EP-0671686A1 is arranged so that a primary controller directly receives write data from a host computer, transfers the received write data to a secondary controller located in a remote place, and reports completion of receipt of the write data to a host computer. This is a quite excellent method from a viewpoint of data security because the data to be stored in the primary controller is completely equivalent to the data to be stored in the secondary controller. However, a longer distance existing between two controllers makes a data transfer time between the controllers far larger. This method therefore has difficulty on performance to be solved if one controller is far away from the other controller.

The European Patent Application Publication No. 0672985A1 also has disclosed a technique of doing dual writing on disks loaded in two controllers far away from each other. The technique disclosed in EP-0672985A1 is arranged so that a primary controller directly receives write data from a primary host computer, immediately after receipt of the write data, reports completion of the receipt of the write data to the primary host computer. In the EP-0672985A1, a copy of the write data received by the primary controller is read out to the primary host computer. According to the invention, a time stamp is given to the write data received from the primary host computer for the first time. The time stamp indicates a time when a request for writing the write data is issued. When the copy of the write data is read out to the primary host computer, the write time is passed to the primary host computer as well. Then, the primary host computer sends the copy of the write data and the write time to a secondary host computer.

When the secondary host computer receives the write data and the write time, information such as the write data is written on the disk for the control purpose. Further, the write data is written on the disk on the secondary side in the sequence of the write time by referring to the time given to each write data record.

In the EP-06729851A1, the secondary host computer performs the foregoing procedure, because it is not desirable to leave the intermediate results of the transactions normally used by an online system. For example, considering a transaction of transferring a bank deposit from a bank account A to another bank account B, though the deposit is withdrawn from the bank account A, the state of having transferred no corresponding deposit to the bank account B is not left. This means that no intermediate result of the transaction is left. Normally, the recovery unit is a transaction on the online system. Hence, leaving the intermediate result of the transaction is a quite significant obstacle.

In turn, why no intermediate result of the transaction can be left by the foregoing process will be briefly described below. The disks on which data is dually written contain a disk for storing a database such as account information and a disk for storing a journal where an update history of the transaction is left. If the host computer is failed, a recovery program is started to analyze the journal so that the update result of the unfinished transaction is returned to the state before the execution and no intermediate result of the transaction is left. The write data written on the disk loaded in the secondary controller is effective only in the cases such as when the primary controller for storing the latest write data is broken. The secondary controller does not store the latest write data but can guarantee the write data up to a certain time. Hence, apparently, the host computer yields an equivalent state to the failed state at a time when the write data is guaranteed. As a result, by using the disk for storing the journal, loaded in the secondary controller and the disk for storing the database, the similar process to the recovery to be executed when the host computer is failed is executed so that the intermediate result of the transaction may not be left.

Further, the disk controller contains a nonvolatile cache memory and provides a write-after technique, that is, a technique of writing the write data received from the host computer onto a non-volatile cache memory and reporting the completion of the write to the host computer. The non-volatile cache memory is highly reliable, so that the data may be sufficiently guaranteed by storing the write data in the cache.

The technique disclosed in the EP-0672985A1 is arranged to suppress the degrade of the performance though some data is lost even if a distance between the controllers is expanded. Further, it does not leave the intermediate result of the transaction.

SUMMARY OF THE INVENTION

However, the technique disclosed in the EP-0672985A1 is arranged so that the primary host computer reads out data and transfers the data to the secondary host computer. Hence, unlike the EP-0671686A1 arranged to directly transfer the write data between the controllers, this technique needs one more data transfers. Further, an I/O process to and from a storage medium such as an MT is required to be done.

It is an object of the present invention to provide a technique which provides functions of directly transferring write data between controllers like the EP-0672985A1, suppressing degrade of the performance to a minimum even if the distance between the controllers is made longer, and leaving no intermediate result of a transaction. Further, no execution of the I/O process of control information to and from disks is required for enhancing the performance.

Later, the description will be oriented to how the present invention realizes the aforementioned object.

According to the present invention, the host computer gives a write time to each write data record when it issues a request for write to a primary controller. When the primary controller receives the write data from the host computer, it reports the completion of the receipt to the host computer. Then, the primary controller sends the write data records and the write times to the secondary controller. At this time, the primary controller operates to send the write data records to the secondary controller in the sequence of the writing times. These series of operations make it possible to suppress the degrade of the performance to a minimum even though the distance between the controllers is made longer.

The secondary controller operates to store the write data received from the primary controller onto a non-volatile cache memory. This makes it possible to guarantee the write data without any I/O process of control information to and from disks.

The secondary controller can guarantee the write data up to a certain time by referring to the received write time. This makes it possible to leave no intermediate result of the transaction.

BRIEF DESCRIPTION OF THE DRAWINGS

FIG. 7 is a diagram showing a process to be executed when a master secondary controller collects information about the write time from the primary controller.

DESCRIPTION OF THE PREFERRED EMBODIMENTS

Hereafter, the description will be oriented to embodiments of the present invention.

(A) First Embodiment

At first, the first embodiment will be described below.

Figure 1:
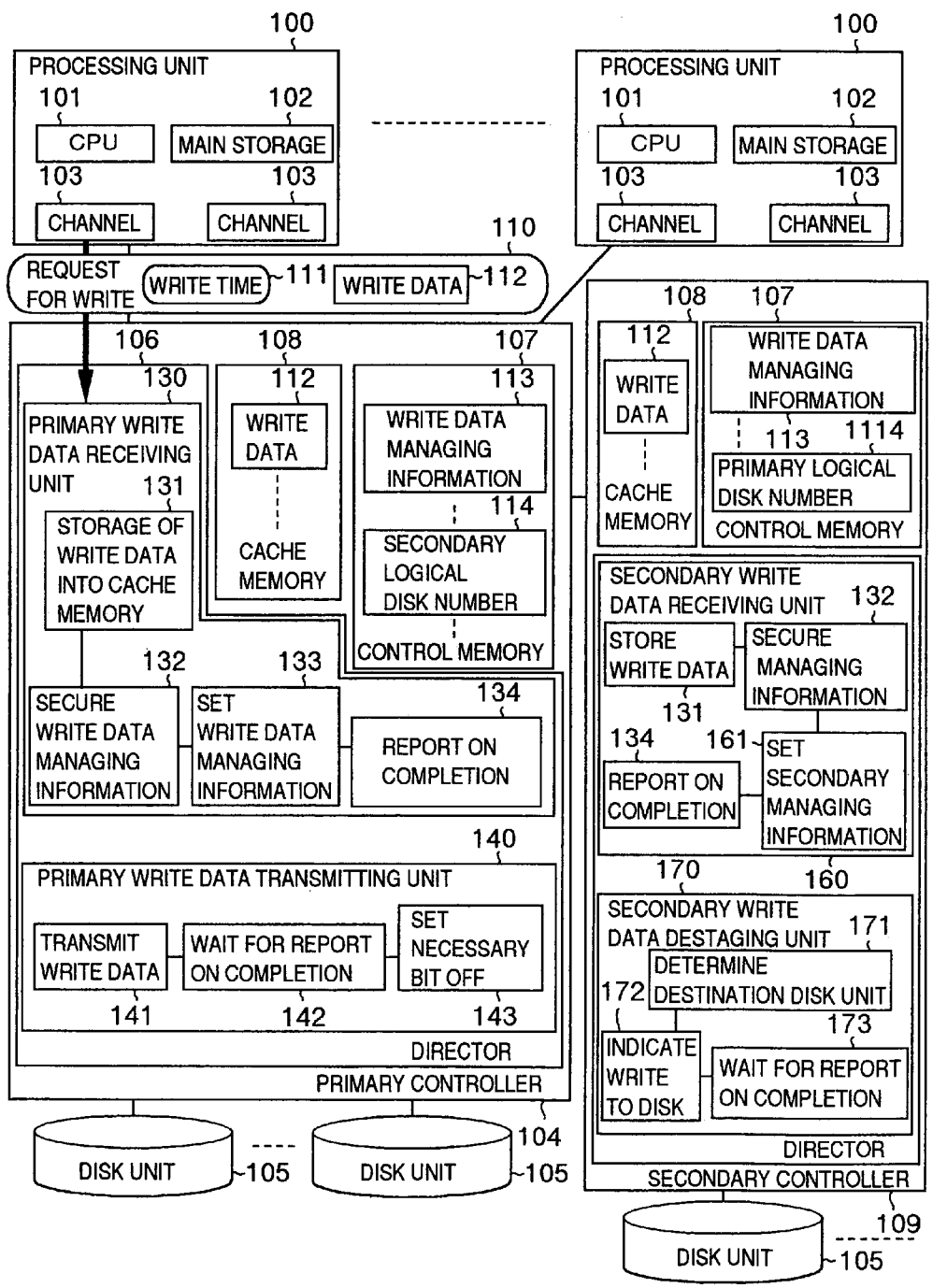
FIG. 1 is a diagram showing a general system configuration according to a first embodiment of the present invention.

FIG. 1 illustrates a general configuration of the first embodiment. The system of the first embodiment is configured to have one or more processing units 100, one primary controller 104, one or more disk units 105 connected to the primary controller 104, one secondary controller 109, and one or more disk units 105 connected to the secondary controller 109. The processing unit 100 is composed of a CPU 101, a main storage 102, and a channel 103. The primary controller 104 contains a control memory 107 and a cache memory 108. The control memory 107 and the cache memory 108 are non-volatilized. For enhancing the reliability, each memory may be dualized. The cache memory 108 or the control memory 107 is composed of a semiconductor memory. As compared with the disk unit 105, the memory 107 or 108 provides a faster accessing capability by one or two digits. The primary controller 104 operates to transfer data between the processing unit 100 and the disk unit 105. Further, according to the present invention, the primary controller 104 provides a function of transferring data with the secondary controller 109. Or, the primary controller 104 contains one or more directors 106, each of which may operate to transfer data between the processing unit 100 and the disk unit 105 and between the secondary controller 109 and the director 106 itself. The internal arrangement of the secondary controller 109 is likewise to that of the primary controller 104.

The write data managing information 113 corresponding to the write data record 112 is created on the control memory 107.

When the processing unit 100 issues a request for write 110 to the primary controller 104, the processing unit 100 operates to give a write time 111 to the write data record 112. The write time 111 represents a time when the request for write 110 is issued. The primary controller 104 and the secondary controller 109 can recognize the sequence of the requests for write 110 issued by the processing unit 100 by referring to this write time 111. If two or more processing units 100 are provided, the write time 111 is defined by using the common clocks among the processing units 100, so that the primary controller 104 and the secondary controller 108 can recognize the sequence of the requests for write 110 issued by different processing units 110.

Figure 2:
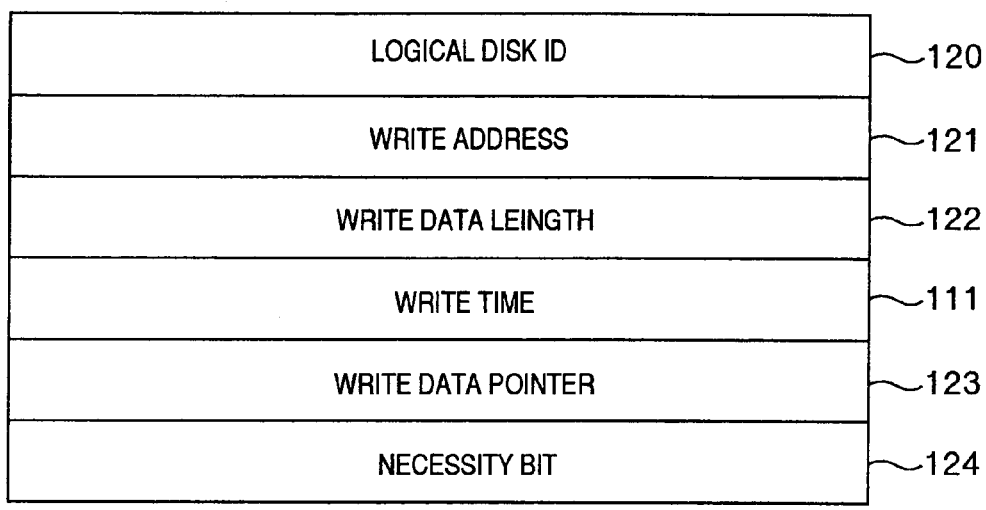
FIG. 2 is a view showing a format of write data managing information.
Figure 3:
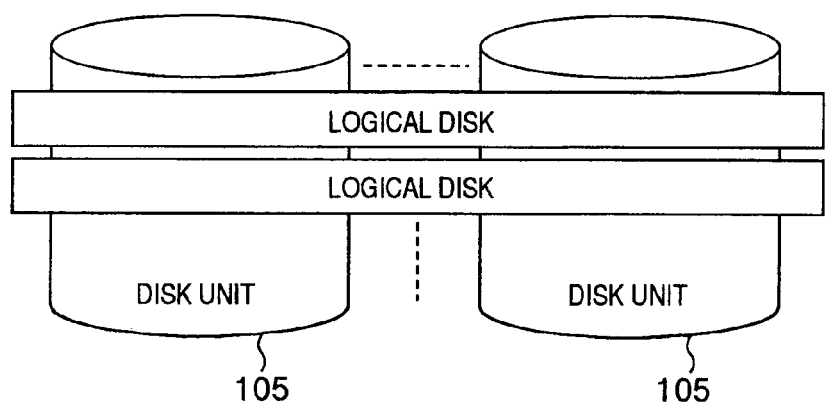
FIG. 3 is an explanatory view showing a logical disk.

FIG. 2 illustrates a composition of write data managing information 113. Herein, in particular, the description will be oriented to the information directly concerned with the present invention. In the present invention, a disk to be specified when the processing unit 100 issues the request for write 110 is referred to as a logical disk. A logical disk ID 120 indicates a number of a logical disk indicated by the processing unit 100 so that the corresponding write data is written on the logical disk and is contained in the request for write 110. This invention does not require the one-to-one correspondence between the logical disk recognized by the processing unit 100 and the disk unit 105 (physical disk). As illustrated in FIG. 3, the logical disk may be defined over two or more disk units 105. Further, the logical disk may contain redundant data and thus employ a RAID (Redundant Array of Inexpensive Disks) arrangement. A numeral 121 denotes a write address that is information (for example, information such as an area of 1 Mbyte starting from a head of the logical disk) for indicating an address inside of a logical disk where the corresponding write data is to be written and is contained in the request for write 110. A numeral 122 denotes a write data length that represents a length of the corresponding write data and is contained in the request for write 110. These pieces of information are all contained in the normal request for write 110. A numeral 123 denotes a write data pointer that is a pointer to the corresponding write data 112 in the cache memory 108. The write time 111 has been already described above. The write time 111 to be given to the request for write 110 is a feature of the invention. A numeral 124 denotes a necessity bit that indicates that the write data is required to be transferred to the secondary controller. (Herein, the bit 124 is referred to as a necessity bit 124.) This necessity bit 124 is information that represents transfer of the corresponding write data 112 to the secondary controller 109.

Another item of information contained in the control memory 107 is a secondary logical disk number 114. This information is located to correspond to the logical disk of the primary controller 104 and contains the numbers of the secondary logical disk of the corresponding logical disk, which are paired for dual writing, that is, a number of the secondary controller 109 for loading the secondary logical disk and a logical disk number located in the secondary controller 109 of the secondary logical disk. Of course, if the logical disk does not have any pair for dual writing, a null value for indicating invalidity is put into the logical disk.

The control memory 107 of the secondary controller 109 contains the write data managing information 113 as well. The information may have the same format as the write data managing information 113 in the primary controller 104, in which the necessity bit 124 is constantly off. The control memory 107 of the secondary controller 109 contains a primary logical disk number. The present information is located to correspond to the logical disk of the secondary controller 109 and contains the numbers of the primary logical disk of the corresponding logical disk, which are paired for dual writing, that is, the number of the primary controller 104 for loading the primary logical disk and the logical disk number in the primary controller 104 of the primary logical disk. Of course, if the logical disk does not contain any pair for dual writing, a null value for indicating invalidity is put into the logical disk.

The primary controller 104 provides a primary write data receiving unit 130, which is started when it receives the request for write 110 from the processing unit 100. At first, the received write data 112 is stored in the cache memory 108 (step 131). Next, the primary write data receiving unit 130 operates to secure the write data managing information 113 inside of the control memory 107 for processing this request for write (step 132). Further, the information such as the write time 111 contained in the request write is stored in the secured write data managing information 113 for setting a write data pointer 123 and the necessity bit 124 (step 133). Finally, the completion of the request for write 110 is reported to the processing unit 100 (step 134). The foregoing processing makes it possible to do a quick response because no access is required for the disk unit 105. The process of writing the write data 112 onto the disk unit 105 is executed by the primary controller 104 at a later stage. This operation is executed by the normal controller. Hence, it is not described in detail.

The primary controller 104 has a primary write data transmitting unit 140, which provides a function of transmitting the write data 112 to the secondary controller 109. At first, the write data record 112 at the earliest write time, included in the write data managing information 113 in which the necessity bit 124 is set, is transmitted to the secondary controller 109 having a pair for dual writing located therein by referring to the corresponding secondary logical disk number 114. The length of the write data 112 and the address inside of the secondary logical disk where the write data is to be written are specified by referring to the information contained in the write data managing information 113 (step 141). Next, the primary write data transmitting unit 140 waits for a report on the completion from the secondary controller 109 (step 142). When the report on the completion is given back, the necessity bit 124 is set off (step 143). Then, the operation goes back to thestep 140 at which the next write data to be transmitted is tried to be found.

The secondary controller 109 has a secondary write data receiving unit 160, which is started when the write data 112 is received from the primary controller 104. The processing content of the secondary write data receiving unit 160 is likewise to that of the primary write data receiving unit 140 except that the setting of the write data managing information 113 does not contain a process of setting the necessity bit 124 (step 161). After the write data 112 from the primary controller 104 is written in the cache 108, the completion of the write is reported to the primary controller 104. The secondary controller 109 has a secondary write data destaging unit 170, which provides a function of writing the write data 112 to the disk unit 105. At first, some write data records 112 included in the write data managing information 113 are determined to be written in the disk unit 105 in the sequence from the earliest write time. Then, a necessary calculation is executed to determine the disk unit 105 where the write data records are to be written and the write address. The method of calculation is not described in detail, because it is used for the normal RAID (step 171). Next, two or more requests for writing the write data 112 to the disk unit 105 are issued to the disk unit 105 in parallel (step 172). Next, the secondary write data destaging unit 170 waits for a report on the completion of the request (step 173). After the reports on the completion of all the requests are received, the operation goes back to the step 171 at which the next write data 113 to be destaged to the next disk unit 105 is tried to be found.

The transmitting sequence of the write data 113 from the primary controller 104 to the secondary controller 109 is the sequence of the write time 111. Hence, the secondary controller 109 enables to generate a state that it can hold all the write data records 113 on or before a reference time and cannot hold all the write data records 113 after the reference time. This operation makes it possible for the secondary controller 109 to do a recovering process without leaving any intermediate result of a transaction if the primary controller 104 is broken. Further, on the secondary controller 109, the control information such as the write data 112 and the write time 111 is held in a non-volatile semiconductor memory such as the cache memory 108 and the control memory 107. Hence, no large overhead is burdened on the performance.

Figure 4:
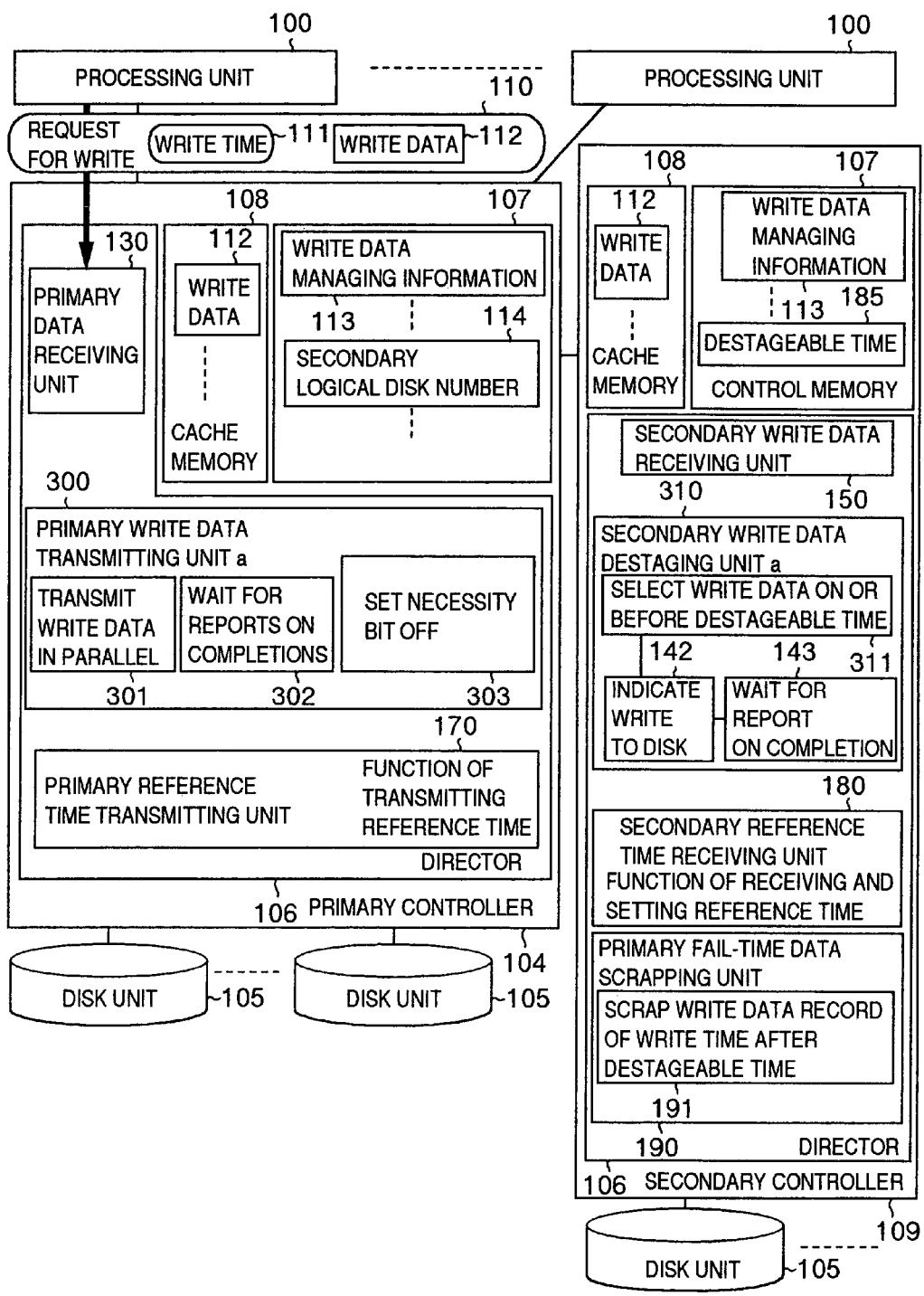
FIG. 4 is an explanatory view showing a process of a secondary write data destaging unit in the case of executing the transfer of the write data from the primary controller to the secondary controller.

The aforementioned process may not provide sufficient performance because the transfer of the write data 112 from the primary controller 104 to the secondary controller 109 is serialized. FIG. 4 illustrates the process executed in the case of transferring the write data 112 from the primary controller 104 to the secondary controller 109 in parallel. In each processing unit, a primary write data transmitting unit a300, a primary reference time transmitting unit 170, a secondary reference time receiving unit 180, a secondary write data destaging unit a310, and a primary fail-time data scrapping unit 190 are changed from the configuration in which the transfer is serialized.

Hereafter, the processing flow of the primary write data transmitting unit a300 will be described. At first, some write data records 112 included in the write data managing information 113 in which the necessity bit 124 is set are transferred in parallel to the secondary controller 109 having a pair for dual writing located therein by referring to the corresponding secondary logical disk number in the sequence from the earliest write time (step 301). Next, the primary write data transmitting unit a300 waits for a report on the completion of each write from the secondary controller 109 (step 302). After all the reports are given back, the necessity bit 124 included in the corresponding write data managing information 113 is set off (step 303). Then, the operation goes back to the step 150 at which the next write data 112 to be transmitted is tried to be found.

The execution of the parallel transfer of the write data records 112 may make each write time 111 of the write data records 112 be out of the sequence. Hence, it is necessary to recognize the reference write time 111 for determining the write data 112 to be destaged by the secondary controller 109. In this case, the write data 112 to be destaged is made to have the earlier write time 111 than the reference time corresponding to the earliest write time 111 among the write data included in the write data managing information 113 where the necessity bit 124 is set on, which are all contained in the primary controller 104. This is because all the write data 112 having the earlier write time 111 than the reference time are held on the side of the secondary controller 109. On the other hand, the write data records 112 having the write time 111 on or before the reference time should not be destaged. If the primary controller 104 is broken, the write data records 112 have to be broken without being destaged.

The primary reference time transmitting unit 170 provides a function of transmitting the destageable reference time to the secondary controller 109. As mentioned above, the reference time is the earliest write time 111 included in the write data managing information 113 where the necessity bit 124 is set on.

The secondary reference time receiving unit 180 operates to store the reference time received from the primary controller 104 in the control memory 108 as a destageable time 185.

FIG. 4 illustrates a processing flow of the secondary write data destaging unit a310 executed in the case of transmitting the write data records 112 from the primary controller 104 to the secondary controller 109 in parallel. The different respect of this flow from the processing flow shown in FIG. 1 is that the condition for selecting the write data 112 to be destaged includes a condition for determining if the write time 111 is on or before the destageable time 185 (step 311).

The primary fail-time data scrapping unit 197 provides a function of scrapping the write data 112 having the write time 111 later than the destageable time 185 when the primary controller 104 is broken (step 191).

(B) Second Embodiment

Next, the second embodiment will be described below.

Figure 5:
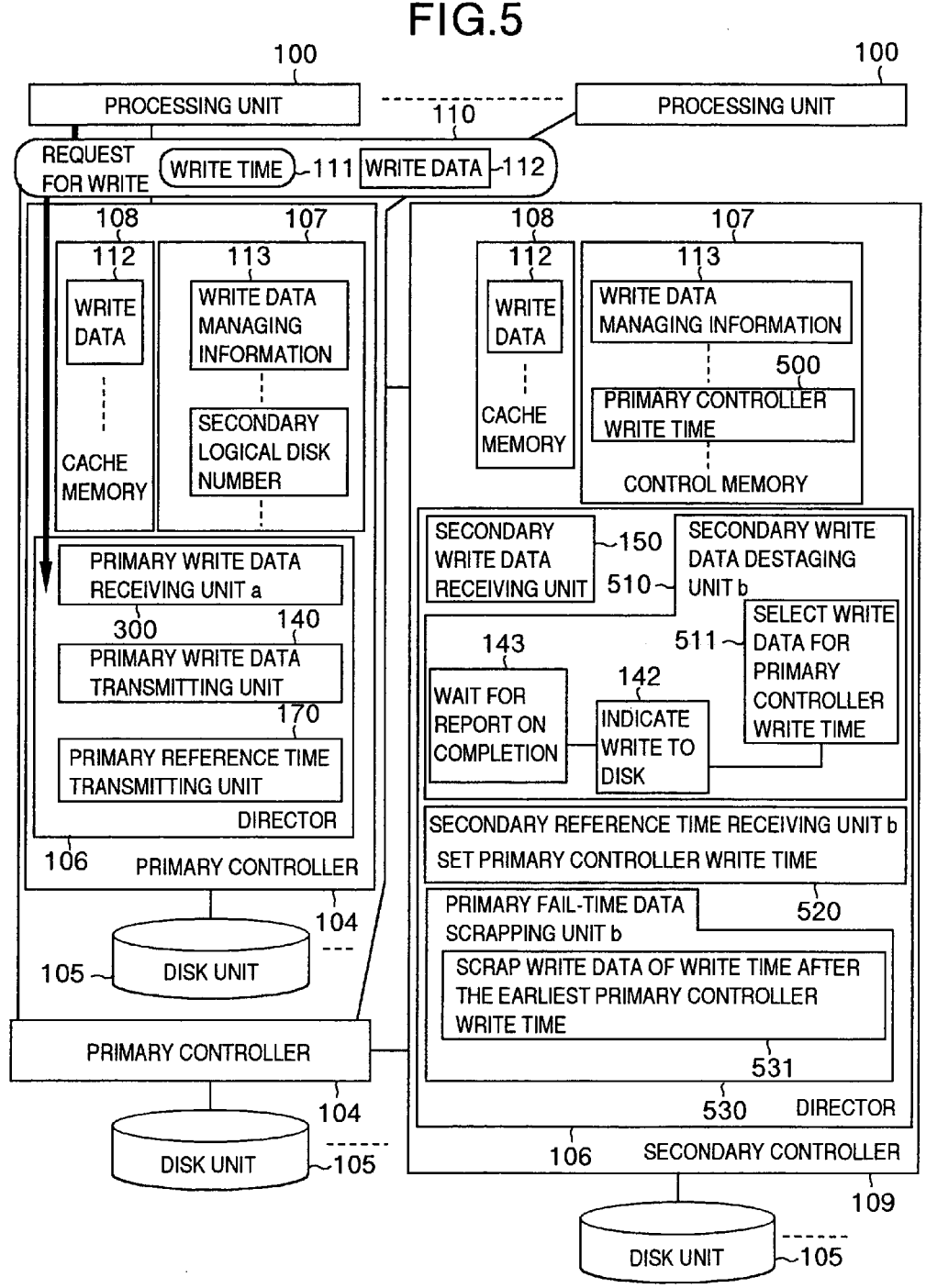
FIG. 5 is a diagram showing a general system configuration according to a second embodiment of the present invention.

FIG. 5 illustrates a system configuration according to a second embodiment of the present invention. The difference between the first and the second embodiments is the number of the primary controllers 104. The system of the first embodiment is configured to have one primary controller 104 and one secondary controller 109, while the system of the second embodiment is configured to have two or more primary controllers 104 and one secondary controller 209.

The provision of two or more primary controllers 104 makes the write time 111 of the write data 112 received from one primary controller 104 shifted from that received from another primary controller 104 on the side of the secondary controller 109. The latest write time III of the write data 112 received from one primary controller 104 (for example, the primary controller a) is assumed as a time a, while the latest write time 111 of the write data 112 received from another primary controller 104 (for example, the primary controller b) is assumed as a time b. In this assumption, if the time a is earlier than the time b, the primary controller b may hold the write data 113 of the time later than the time a but earlier than the time b. As mentioned above, in order to erase the intermediate result of a transaction, it is necessary to guarantee all the write data records 113 of the write time 112 on or before a reference time and discard all the write data records 113 of the later write times 112 than the reference time. Hence, the write data record 112 of the write time 111 on or before the time a is made to be the write data record 112 to be destaged on the secondary controller 109.

In correspondence with the above, the control memory 108 of the secondary controller 109 stores a write enable time 500 to the primary controller. The write enable time 500 is the information existing in each primary controller 104 and is the latest write time 111 received from the corresponding primary controller 104. As mentioned above, therefore, of these write enable times 500, the write data record 112 of the write time 111 on or before the reference time, that is, the earliest time corresponds to the write data record 112 to be destaged onto the secondary controller 109.

Later, about the present embodiment, the description will be oriented to the content of each processing unit in the case of transferring the write data 112 from one primary controller 104 to the secondary controller 109 in parallel. It goes without saying that the present embodiment is effective in the case of serializing the transfer of the write data 112 from one primary controller 104 to the secondary controller 109.

The processing flow of each processing unit included in the primary controller 104 is likewise to the processing flow (the process shown in FIG. 3) executed in the case of transferring the write data 112 in parallel in the first embodiment.

In turn, the description will be oriented to the processing flow of each processing unit included in the secondary controller 109.

The description will be oriented to the processing flow of a secondary write data destaging unit b510. Herein, the description will be oriented to the difference between the processing flow of the secondary write data destaging unit 520 included in the second embodiment and the processing flow of the secondary write data destaging unit 170 included in the first embodiment. The content of the process executed in the secondary write data receiving unit 510 according to the second embodiment is executed to check if the corresponding write time 111 is on or before all the write enable times 500 and select the write data record 112 for meeting the condition (step 511). Except this process, the processing flow of the secondary write data destaging unit b510 included in the second embodiment is likewise to the processing flow of the secondary write data destaging unit 170 included in the first embodiment.

The secondary reference time receiving unit b520 operates to set the reference time received from the primary controller 104 as a write enable time 500 of the primary controller 104 having transmitted the reference time.

In this embodiment, the write data 112 to be scrapped by the primary fail-time data scrapping unit b530 corresponds to the write data 112 that does not meet the condition that the corresponding write time 111 is on or before the write enable times 500 of all the primary controllers (step 531).

(C) Third Embodiment

In turn, the description will be oriented to the third embodiment of the invention.

Figure 6:
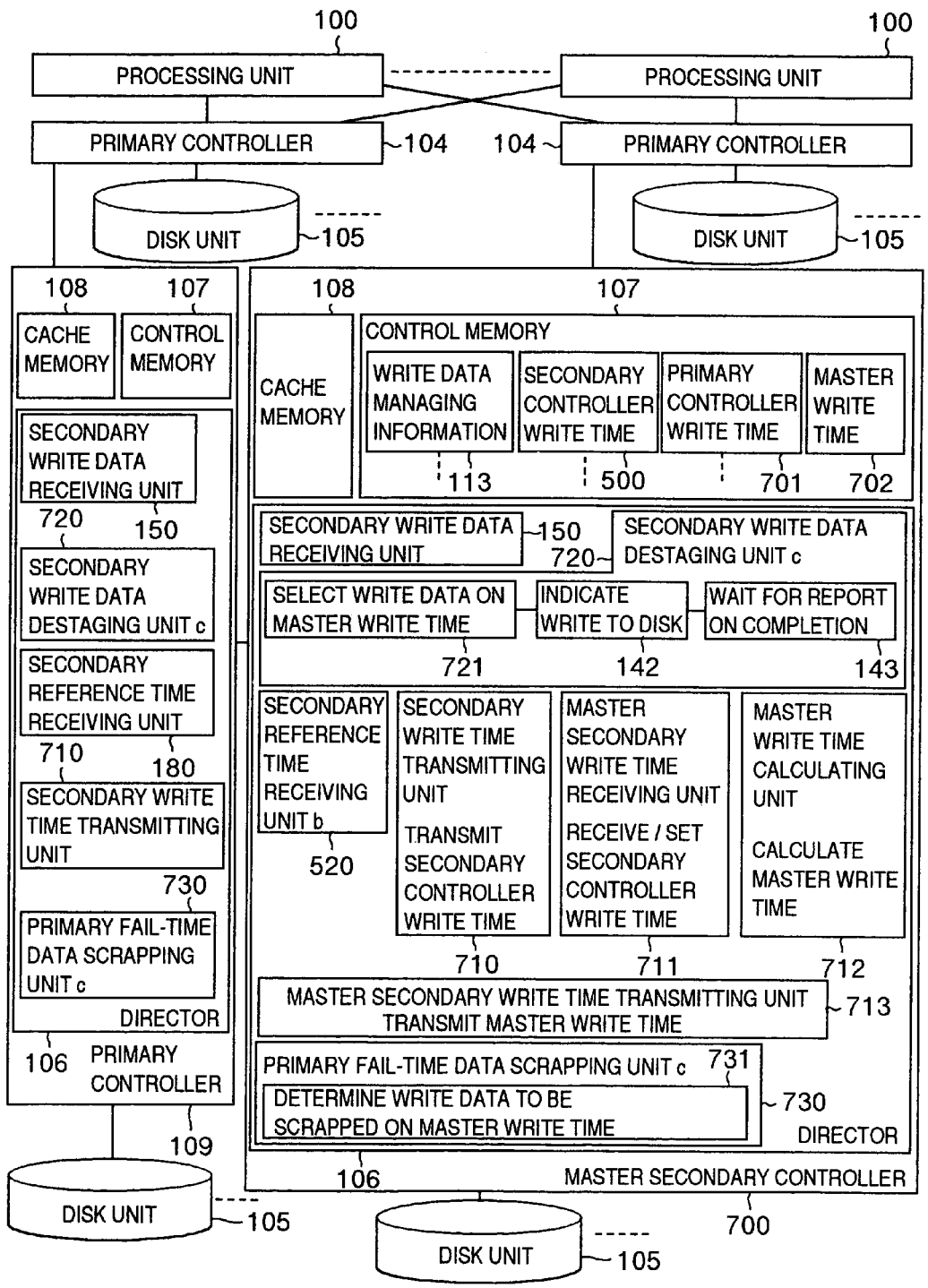
FIG. 6 is a diagram showing a general system configuration according to a third embodiment of the present invention.

FIG. 6 illustrates a general system configuration according to the third embodiment. The difference between the second and the third embodiments is also the numbers of the primary controllers 104 and the secondary controllers 109. The system of the third embodiment is configured to have two or more primary controllers 104 and one or more secondary controllers 109. In this case, each pair of the primary controller 104 and the secondary controller 109 is not required to be connected.

If two or more secondary controllers 109 are provided, in order to erase the intermediate result of a transaction, it is necessary to keep the reference times used for selecting the write data records 112 to be destaged common among the secondary controllers 109. This is because the database and the journal may be distributed among the secondary controllers 109.

According to this embodiment, a master secondary controller 700 provides a function of determining the reference time used for selecting the write data record 112 to be destaged. Hence, a data transfer path is connected between the master controller 700 and the other secondary controllers 109. If the data transfer path is failed, it is impossible to keep the reference times used for selecting the write data records 112 to be destaged common among the secondary controllers 109. Hence, multiplexing the data transfer path is preferable. In this embodiment, the master secondary controller 700 provides a function of determining the reference time used for selecting the write data record 112 to be destaged. Without providing the specific secondary controller 109 with the function of determining the reference time, the method for distributing the function among the secondary controllers 109 (for example, the method wherein the secondary controllers 109 alternately determine the reference time) may be employed for implementing the present invention.

In correspondence with the above, the control memory 107 of the master secondary controller 700 stores a write time 701 of the secondary controller. This write time 701 is the information corresponding to the secondary controllers 109 containing the master secondary controller 700. The write time 701 of each secondary controller corresponds to the information periodically received by the master secondary controller 700 from each secondary controller 109 at the earliest time (the reference time on which the secondary controller 109 selects the secondary controller 109 in the second embodiment) among all the primary controller write enable times 500 contained in the secondary controller 109. In the third embodiment, the master write time 702 is a reference time on which each secondary controller 109 selects the write data. The master write time 702 is set by the process wherein the master secondary controller 700 refers to all the secondary controller write times 701 at a proper period and selects the earliest time. All the write data records 112 having the write times 111 on or before the selected time are contained in the secondary controller 109. Hence, by guaranteeing the write data 112 that meet this condition and scrapping all the write data 112 that do not meet it, it is possible to erase the intermediate result of the transaction.

Hereafter, also in this embodiment, the description will be oriented to the content of each processing unit in the case of transferring the write data 112 from one primary controller 104 to the secondary controllers 109 in parallel. It goes without saying that this embodiment is effective if the transfer of the write data 112 from one primary controller 104 to the secondary controllers 109 is serialized.

The processing flow of each processing unit included in the primary controller 104 is substantially similar to that of the second embodiment. It goes without saying that the primary reference time transmitting unit 170 provides a function of transmitting a reference time to each secondary controller 109 for transmitting the write data 112. The reference time to be transmitted corresponds to the earliest write time 111 contained in the write data managing information 113 in which the necessity bit 124 of each write data record 112 corresponding to the secondary controller 109 for transmitting the reference time is set on.

The different respect of the processing flow of the third embodiment from that of the second embodiment is that the secondary controller 109 contains a secondary write time transmitting unit 710, a secondary write data destaging unit c720, and a primary fail-time data scrapping point c, and the master secondary controller 700 contains a master secondary write time receiving unit 711, a master write time calculating unit 712, and a master secondary write time transmitting unit 713.

The secondary write time transmitting unit 710 operates to transmit the earliest time 180 included in all the primary controller write enable times 500 stored in the primary controller 109 to the master secondary write time receiving unit 711 included in the master secondary controller 700 at a proper period. The secondary write time transmitting unit 710 included in the secondary controller 109 except the master secondary controller 700 makes use of a data transfer path between the secondary controllers 109. The secondary write time transmitting unit 710 of the master secondary controller 700 makes use of communicating means provided in the master secondary controller 700.

The master secondary write time receiving unit 711 operates to set the time received from the secondary write time transmitting unit 710 to the secondary controller write time 701 corresponding to the secondary controller 109 having transmitted the time.

The master write time calculating unit 712 operates to refer to all the secondary controller write times 701, select the earliest time, and then set the time as the master write-time 702.

The master secondary write time transmitting unit 713 operates to transmit the time set as the master write time 702 at a proper period in response to the requests issued from the secondary write data destaging unit 720 and the primary fail-time data scrapping unit 730 included in each secondary controller 109. The secondary controller 109 rather than the master secondary controller 700 makes use of the data transfer path between the secondary controllers 109. For the request issued from the master secondary controller 700, the master secondary write time transmitting unit 713 makes use of communicating means provided in the master secondary controller 700.

The different aspect of the secondary write data destaging unit 720 from that of the second embodiment is that when selecting the write data 112 to be destaged, the secondary write data destaging unit 720 operates to receive the reference time from the master secondary write time transmitting unit 713 and select the write data 112 with the earlier write time 111 than the reference time as the write data to be destaged (step 721).

The different aspect of the primary fail-time data scrapping unit c730 from that of the second embodiment is that when selecting the write data 112 to be scrapped from the cache memory 107, the primary fail-time data scrapping unit c730 operates to receive the reference time from the master secondary write time transmitting unit 713 and select the write data 112 except all the write data 112 with the earlier write time 111 than the reference time as the write data to be scrapped (step 731).

According to this embodiment, the master controller 700 is arranged to receive the information required for calculating the reference time from the secondary controller 109. In place, it may be arranged to receive the information from the primary controller 104 as shown in FIG. 7. In this case, the control memory 108 of the master secondary controller 700 stores a master primary controller write time 800. The write time 800 corresponds to the primary controller 104. The write time 800 is set as follows. The master secondary controller 700 receives the earliest write time 111 included in all the write data managing information 113 containing the necessity bits 124 being set at a proper period and sets it as the write time 800 inside of the primary controller 107. For the master write time 702, the master secondary controller 700 operates to refer to all the primary controller write times 701, select the earliest time and set it as the master write time 702 at a proper period. Like the foregoing embodiments, the reference time for the destaging or the data scrapping is the master write time 702.

What is claimed is:

1. A system for storing data comprising:
   a plurality of first storage systems each of which includes a first controller and a first disk unit;
   a plurality of a second storage systems each including a second cache memory, a second controller, and a second disk unit; and
   a third controller coupled to said second storage systems,
   wherein each of said first storage systems receives write data and a write time from a processing unit, and transmits received write data and write time to one of said second storage systems,
   wherein second controller of each second storage system stores a plurality of write data received from said first storage systems to said second cache memory, receives a destageable time from said third controller, and stores write data from said second cache memory to said second disk unit if a write time corresponding to said write data is earlier than said destageable time,
   wherein each of said plurality of second storage systems receives a plurality of first reference times from said plurality of first storage systems, determines a second reference time based on the received plurality of first reference times, and transmits said second reference time to said third controller, and
   wherein said third controller determines said destageable time based on a plurality of second reference times received from said plurality of second storage systems.

2. The system of claim 1, wherein said second reference time is an earliest time in said plurality of first reference times received from said plurality of first storage systems, and said destageable time is an earliest time in said plurality of second reference times received from said plurality of second storage systems.

3. A storage system coupled to a plurality of other storage systems comprising:
   a plurality of disk controllers, each disk controller being coupled to said plurality of other storage systems;
   a disk unit coupled to said disk controller; and
   a cache memory,
   wherein each of said disk controllers receives plural pairs of write data and write time from said plurality of other storage systems, stores a write data to said cache memory, receives a destageable time from a controller coupled to said disk controller, and stores a write data from said cache memory to said disk unit if a write time corresponding to said write data is earlier than said destageable time,
   wherein each of said plurality of disk controllers receives a plurality of first reference times from said plurality of other storage systems, determines a second reference time based on the received plurality of first reference times, and transmits said second reference time to said controller, and
   wherein said destageable time is determined by said controller based on a plurality of second reference times received from said plurality of disk controllers.

4. The system of claim 3, wherein said second reference time is an earliest time in said plurality of first reference times, and said destageable time is an earliest time in said plurality of second reference times.

* * * * *